US012658388B2

(12) United States Patent
Pisuk et al.

(10) Patent No.: US 12,658,388 B2
(45) Date of Patent: Jun. 16, 2026

(54) SENSOR ASSEMBLIES UTILIZING A ONE-PIECE THERMAL ISOLATED FITTING TUBE AND METHODS OF ASSEMBLING THE SAME

(71) Applicant: SENSATA TECHNOLOGIES, INC., Attleboro, MA (US)

(72) Inventors: Michelle Pisuk, Waltham, MA (US); Richard Gordon, Middleboro, MA (US); Michael Falco, Pascoag, RI (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 979 days.

(21) Appl. No.: 17/861,984

(22) Filed: Jul. 11, 2022

(65) Prior Publication Data

US 2023/0010041 A1 Jan. 12, 2023

Related U.S. Application Data

(60) Provisional application No. 63/220,643, filed on Jul. 12, 2021.

(51) Int. Cl.
*H01H 35/24* (2006.01)
*H01H 11/04* (2006.01)

(52) U.S. Cl.
CPC ............ *H01H 35/24* (2013.01); *H01H 11/04* (2013.01)

(58) Field of Classification Search
CPC ............................... H01H 35/24; H01H 11/04
See application file for complete search history.

(56) References Cited

U.S. PATENT DOCUMENTS

2010/0064816 A1* 3/2010 Filippi ................ G01L 19/0645 228/175
2017/0190570 A1* 7/2017 Kwa ..................... B81B 7/0035

FOREIGN PATENT DOCUMENTS

FR 2878306 A1 * 5/2006 ............. F16J 15/104

OTHER PUBLICATIONS

Extended European Search Report, EP22184365.9, dated Dec. 1, 2022, 8 pages.
European Patent Office, Application No. 22184365.9, First Examination Report dated Mar. 28, 2024, 6 pages.
Hellermanntyton, "Cable Protection Systems—Grommets," https://www.hornbach.nl/p/schemerlamp-montageset-m10-9-delig/8182536/, Oct. 1, 2015, pp. 344-345.

* cited by examiner

*Primary Examiner* — Jamel E Williams
(74) *Attorney, Agent, or Firm* — Mark H. Williams

(57) ABSTRACT

Embodiments in accordance with the present disclosure are directed to sensor apparatuses utilizing a one-piece thermal isolated fitting (TIF) tube and methods of assembling the same. In a particular embodiment, a sensor apparatus includes a one-piece thermal isolated fitting (TIF) tube that includes a cylindrical shaped body portion and a flange at one end of the TIF tube. In this example embodiment, the flange has a top surface that is facing away from the cylindrical shaped body portion and an underside surface that is facing towards the cylindrical shaped body portion.

9 Claims, 5 Drawing Sheets

SENSOR ASSEMBLIES UTILIZING A ONE-PIECE THERMAL ISOLATED FITTING TUBE AND METHODS OF ASSEMBLING THE SAME

CROSS-REFERENCE TO RELATED APPLICATIONS

This application is a non-provisional application for patent entitled to a filing date and claiming the benefit of earlier-filed U.S. Provisional Patent Application Ser. No. 63/220,643, filed Jul. 12, 2021, the contents of which are incorporated herein by reference in their entirety.

BACKGROUND

Pressure switches are commonly manufactured with a thermal isolated fitting (TIF) tube assembly. The TIF tube assembly includes of a tube portion and a housing portion. In most instances, the material of the housing portion has a greater thickness than the tube portion. The difference in thickness levels between the tube and the housing precludes the manufacturing option of drawing the tube as a one-piece unit, therefore the tube portion and housing portion are typically brazed together with a braze ring to create a brazed tube assembly. This brazing process can be expensive and time consuming. Additionally, the brazing seam is susceptible to leaks and results in quality issues.

SUMMARY

Embodiments in accordance with the present disclosure are directed to sensor apparatuses utilizing a one-piece thermal isolated fitting (TIF) tube and methods of assembling the same. In a particular embodiment, a sensor apparatus is described that includes a one-piece thermal isolated fitting (TIF) tube that includes a cylindrical shaped body portion and a flange at one end of the TIF tube. In this example embodiment, the flange has a top surface that is facing away from the cylindrical shaped body portion and an underside surface that is facing towards the cylindrical shaped body portion.

In another embodiment, a sensor apparatus is described that includes a one-piece thermal isolated fitting (TIF) tube having a cylindrical shaped body portion and a flange at one end of the TIF tube. In this example embodiment, the flange has a top surface that is facing away from the cylindrical shaped body portion and an underside surface that is facing towards the cylindrical shaped body portion. The sensor apparatus also includes a disc attached to the top surface of the flange and a support ring attached to the disc.

In another embodiment, a method of assembling a sensor apparatus is described that includes welding a disc to a top surface of a flange of a one-piece thermal isolated fitting (TIF) tube. In this example embodiment, the TIF tube includes a cylindrical shaped body portion having the flange at one end of the TIF tube. The top surface of the flange is facing away from the cylindrical shaped body portion. According to this example embodiment, the flange also has an underside surface that is facing towards the cylindrical shaped body portion. In this example embodiment, the method also includes welding a support ring to the disc.

As will be explained below, because the TIF tube of the sensor assembly described in the example embodiments is constructed and formed as a single one-piece part, the brazing operation, the housing, and the brazen ring that were required for assembling the known sensor apparatus with a TIF tube assembly may be eliminated, which also eliminates a potential leak path in the blazing seam between the housing and the TIF tube.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The following brief description of the drawings is meant to help one skilled in the art understand and enable the practice of various embodiments disclosed herein. It is not meant in any way to unduly limit any present or subsequent claims in or related to this application.

DETAILED DESCRIPTION

Figure 1:
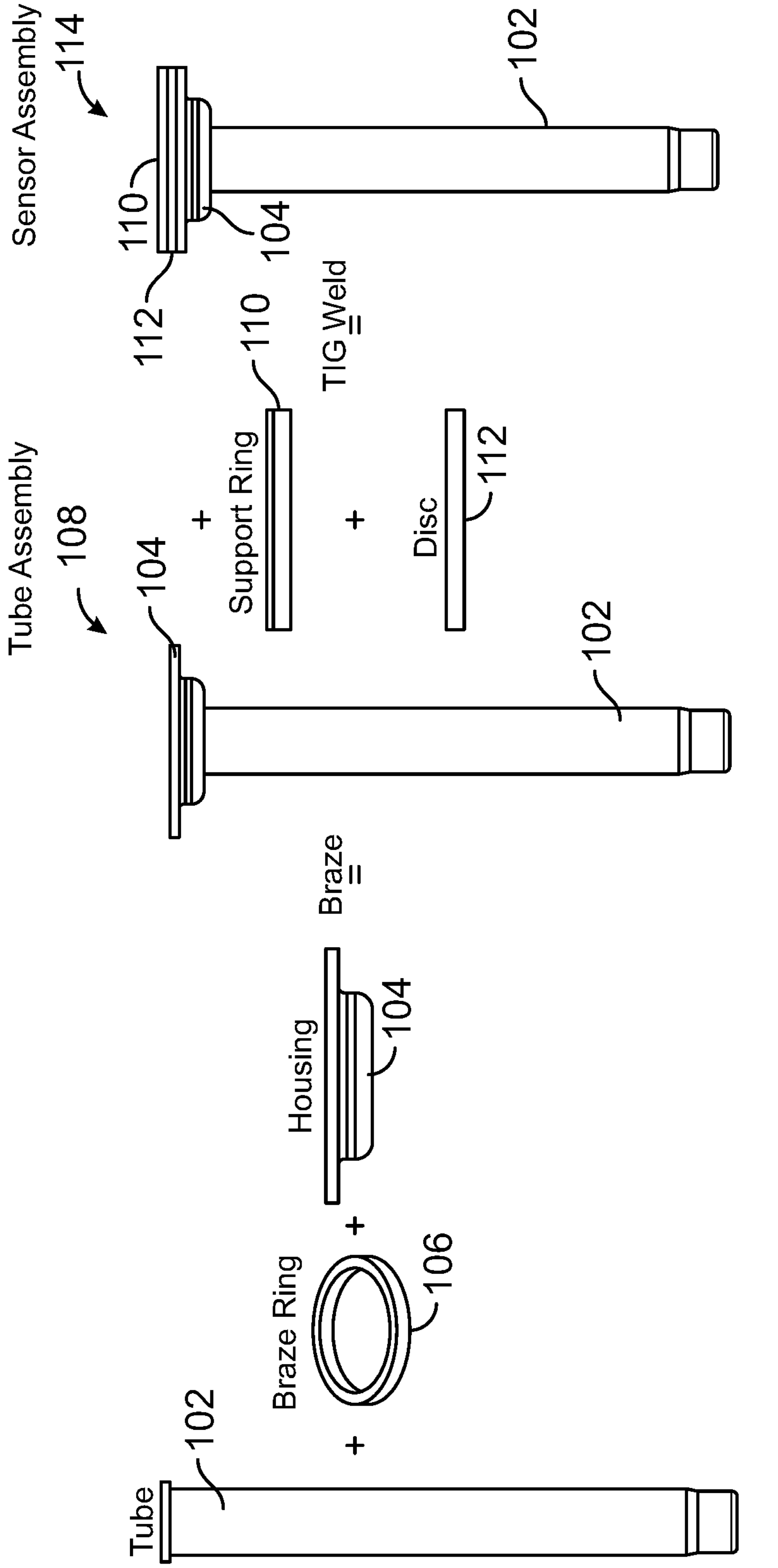
FIG. 1 sets forth a diagram of a known sensor assembly utilizing a thermal isolated fitting (TIF) tube assembly formed by a brazing operation.

The following detailed description is meant to help one skilled in the art understand and enable the practice of various embodiments disclosed herein. It is not meant in any way to unduly limit any present or subsequent claims in or related to this application.

The subject technology addresses many of the noted issues. The advantages, and other features of the system design disclosed herein, will become more readily apparent to those having ordinary skill in the art from the following detailed description of certain embodiments taken in conjunction with the drawings which set forth representative embodiments of the present invention and wherein like reference numerals identify similar structural elements.

The terminology used herein for the purpose of describing particular examples is not intended to be limiting for further examples. Whenever a singular form such as “a”, “an” and “the” is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms “comprises”, “comprising”, “includes” and/or “including”, when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being “connected” or “coupled” to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Exemplary sensor apparatuses utilizing a one-piece thermal isolated fitting (TIF) tube and methods of assembling the same in accordance with the present disclosure are described with reference to the accompanying drawings, beginning with FIG. 1. FIG. 1 sets forth a diagram of a known sensor assembly (114) utilizing a thermal isolated fitting (TIF) tube assembly (108) formed by a brazing operation. In the example of FIG. 1, a housing (104) and a braze ring (106) are added to a TIF tube (102) and blazed together during a brazing operation to create the TIF tube assembly (108). During a subsequent assembly step of the known sensor assembly (114), a welding operation is utilized to weld a disc (110) to a flange portion of the housing and weld a support ring (112) to the disc (110). As mentioned above, in this method of assembling the known sensor assembly, the brazing operation creates a brazing seam between the tube (102) and the housing (104), which may lead to undesired leak paths in the sensor assembly (114).

Figure 2:
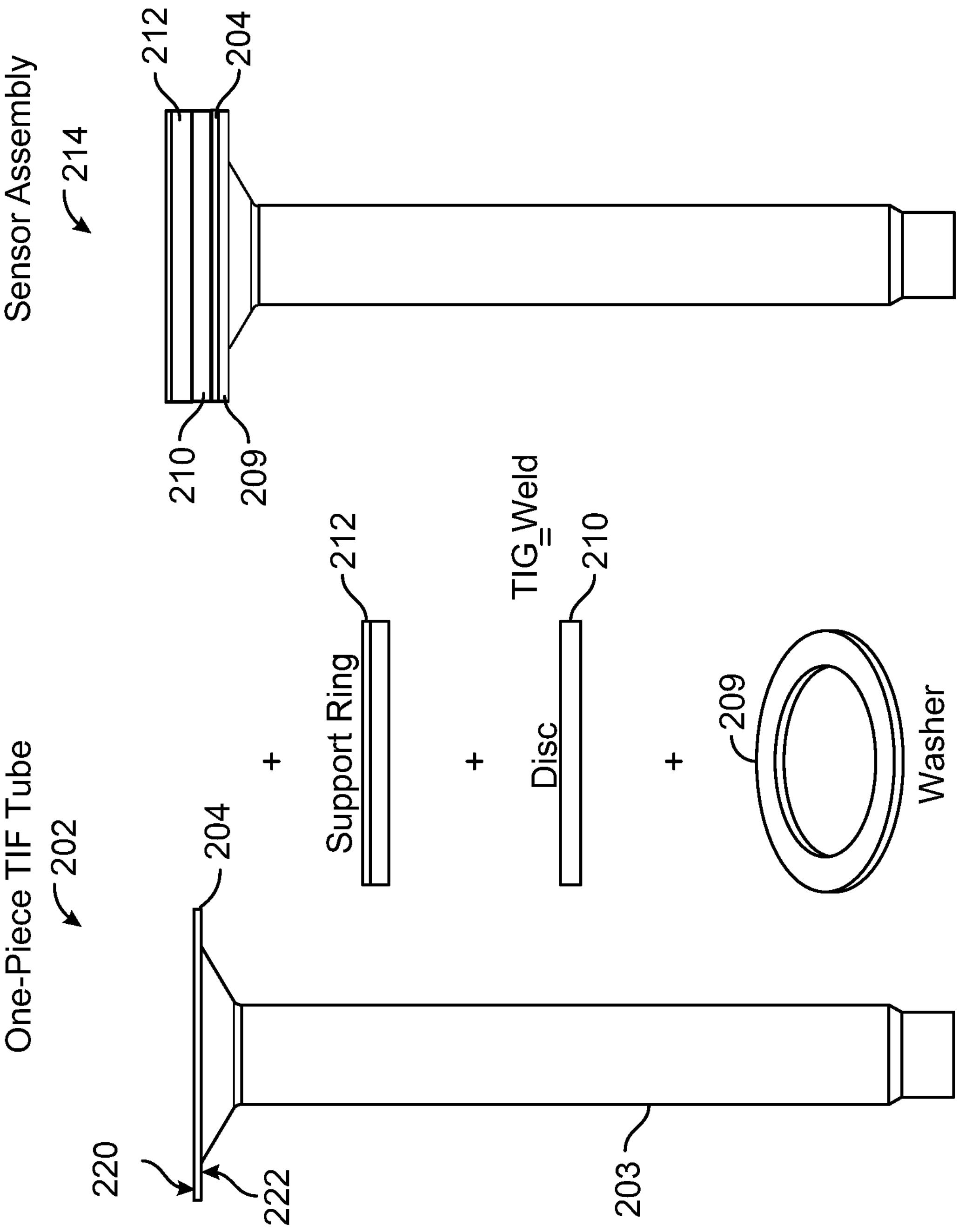
FIG. 2 sets forth a diagram of a sensor assembly utilizing a one-piece TIF tube in accordance with at least one embodiment of the present disclosure.

For further explanation, FIG. 2 sets forth a diagram of a sensor assembly (214) utilizing a one-piece TIF tube (202) in accordance with at least one embodiment of the present disclosure. In the example of FIG. 2, the TIF tube (202) is a one-piece part that includes a cylindrical shaped body portion (203) and a flange (204) at one end of the TIF tube (202). In a particular embodiment, the one-piece TIF tube with the flange is molded as a single piece.

In the example of FIG. 2, the flange (204) is a protruding circular edge surrounding the end of the TIF tube. As shown in FIG. 2, the flange (204) has a top surface (220) that is facing away from the cylindrical shaped body portion (203). The flange (204) also has an underside surface (222) that is facing towards the cylindrical shaped body portion (203). Because the TIF (202) is formed a single piece that includes the flange (204), the housing (104), the braze ring (106), and the braze operation that are required for assembling the known sensor assembly (114) of FIG. 1 are eliminated from the sensor assembly (214) of FIG. 2.

In a particular embodiment, the sensor assembly (214) is assembled by adding a disc (210) and a support ring (212) to a top surface (220) of the flange (204) and adding a washer (209) to an underside surface (222) of the flange (204) during a weld operation. In a particular embodiment, the weld operation is a Tungsten Inert Gas (TIG) weld operation. In the example of FIG. 2, the washer (209) provides mechanical support previously provided by the housing (104) of the known TIF tube assembly (108) of FIG. 1. By utilizing a one-piece TIF tube, the sensor assembly (214) may be formed without the blazing operation, which eliminates a potential leak path in the blaze seam between the housing (104) and the TIF tube (102).

In various embodiments, the material used for the TIF tube (202) is a mixture of cooper and stainless steel. For example, in one embodiment, the TIF tube includes 15% copper/85% stainless steel-clad material. The copper is used in some embodiments where brazing is needed further down the assembly line while the stainless steel provides the strength to meet burst pressure requirements. Other embodiments may use different percentages of copper and stainless steel. Readers of skill in the art will realize that the material in other embodiments may be comprised of stainless steel or any other combination of suitable materials.

Figure 3:
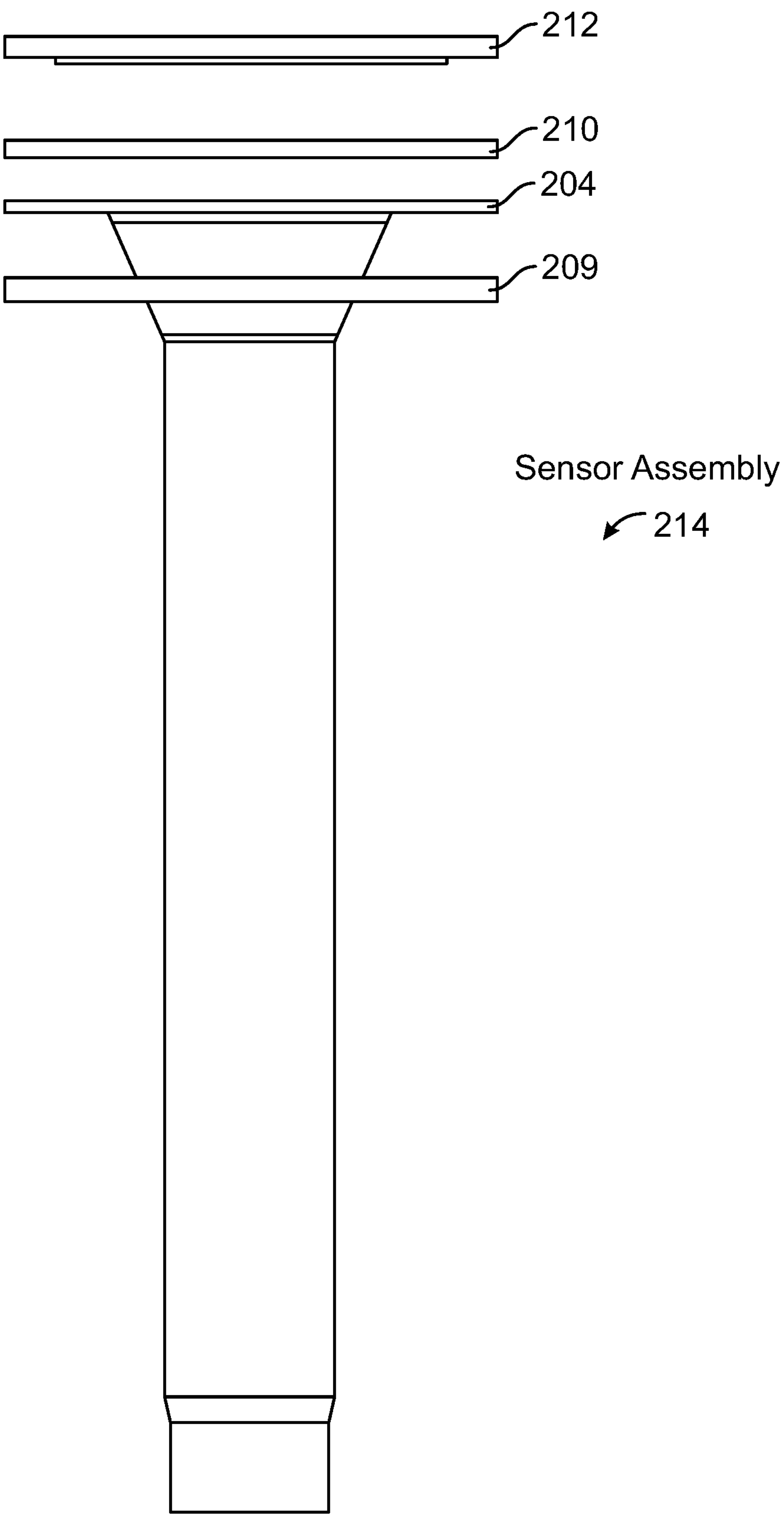
FIG. 3 sets forth a diagram illustrating an exploded view of the sensor assembly of FIG. 2.

For further explanation, FIG. 3 sets forth a diagram illustrating an exploded view of the sensor assembly (214) of FIG. 2. As explained in the description of FIG. 2, various embodiments of the sensor assembly (214) include the disc (210) and a support ring on the top surface (220) of the flange (204) of the one-piece TIF tube (202). The washer (209) may be added to the underside surface (222) of the flange (204) to increase the thickness to levels necessary to avoid pressure shifts.

A diameter of the flange (204) of the TIF tube (202) may be selected to substantially match the diameter of the housing (104) of the known TIF tube assembly (114) of FIG. 1 and a length of the TIF (202) may be selected to keep the height of the sensor assembly (214) substantially the same as the known TIF tube assembly (114) of FIG. 1. As explained above, the disc (210), the support ring (212), the washer (209) and the flange (204) are joined at their circumference by a weld operation, thus eliminating the brazing process described in FIG. 1.

Figure 4:
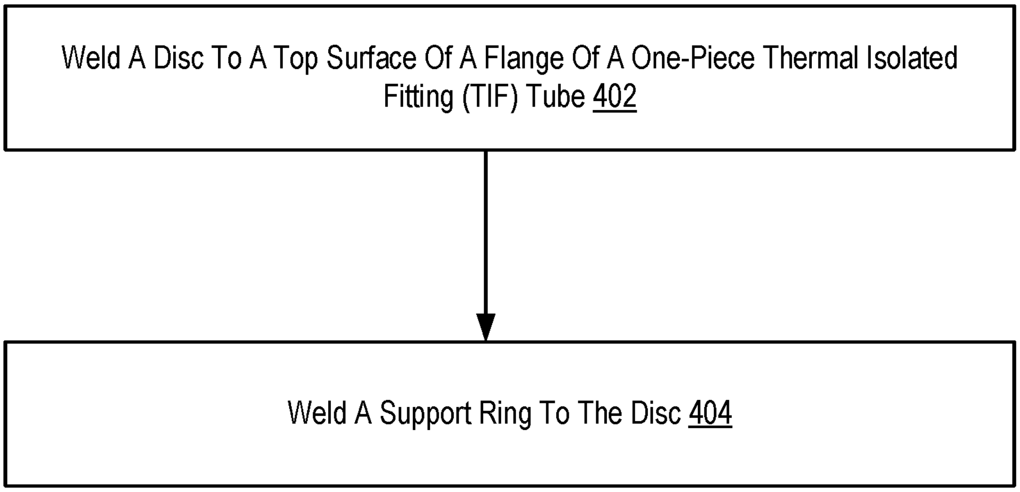
FIG. 4 sets forth a flowchart of an example method for assembling a sensor assembly in accordance with at least one embodiment of the present disclosure.

For further explanation, FIG. 4 sets forth a flowchart of an example method for assembling a sensor assembly in accordance with at least one embodiment of the present disclosure. In the description of the method of FIG. 4, reference is made to the components of the sensor assembly (214) of FIG. 2. The method of FIG. 4 includes welding (402) a disc (210) to a top surface (220) of a flange (204) of a one-piece thermal isolated fitting (TIF) tube (202). In various embodiments, the material used for the tube (202) is a mixture of copper and stainless steel-clad material. Other embodiments may use different percentages of copper and stainless steel. Readers of skill in the art will realize that the material in other embodiments may be comprised of stainless steel or any other combination of suitable materials.

In the example of FIG. 4, the TIF tube (202) includes a cylindrical shaped body portion having the flange (204) at one end of the TIF tube (202). As described above in FIG. 2 and FIG. 3, the top surface (220) of the flange (204) faces away from the cylindrical shaped body portion (203). The flange (204) also has an underside surface that faces towards the cylindrical shaped body portion (203). Welding (402) the disc (210) to a top surface (220) of a flange (204) of a one-piece thermal isolated fitting (TIF) tube (202) may be carried out by welding the pieces together during a Tungsten Inert Gas (TIG) weld operation; and welding the circumference of the disc (210) and the circumference of the top surface (220) of the flange (204).

The method of FIG. 4 also includes welding (404) the support ring (212) to the disc (210). Welding (404) the support ring (212) to the disc (210) may be carried out by welding the pieces together during a Tungsten Inert Gas (TIG) weld operation; and welding the circumference of the disc (210) and the circumference of the support ring (212). In a particular embodiment, the support ring (212) is welded to the disc (210) in the same welding operation in which the disc (210) is welded to the top surface (220) of the flange (204) of the TIF tube (202).

Figure 5:
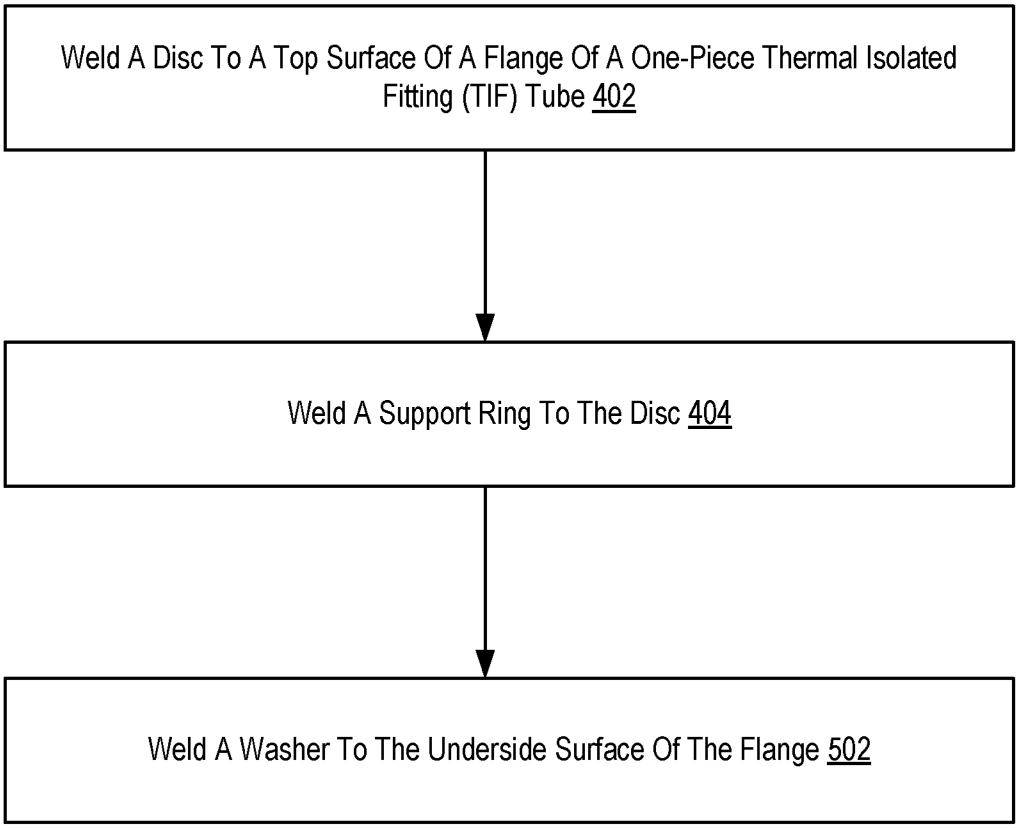
FIG. 5 sets forth a flowchart of another example method for assembling a sensor assembly in accordance with at least one embodiment of the present disclosure.

For further explanation, FIG. 5 sets forth a flowchart of another example method for assembling a sensor assembly in accordance with at least one embodiment of the present disclosure. The method of FIG. 5 includes the elements of the method of FIG. 4. In addition, the method of FIG. 5 also includes welding (502) the washer (209) to the underside surface (222) of the flange (204). The washer (209) may be added to the underside surface (222) of the flange (204) to increase the thickness to levels necessary to avoid pressure shifts.

A diameter of the flange (204) of the TIF tube (202) may be selected to substantially match the diameter of the housing (104) of the known TIF tube assembly (114) of FIG. 1 and a length of the TIF (202) may be selected to keep the height of the sensor assembly (214) substantially the same as the known TIF tube assembly (114) of FIG. 1.

Welding (502) the washer (209) to the underside surface (222) of the flange (204) welding the pieces together during a Tungsten Inert Gas (TIG) weld operation; and welding the circumference of the washer (209) and the circumference of the underside surface (222) of the flange (204). In a particular embodiment, the washer (209) is welded to the underside surface (222) in the same welding operation in which the disc (210) is welded to the top surface (220) of the flange (204) of the TIF tube (202) and the support ring (212) is welded to the disc (210).

In view of the explanations set forth above, readers of skill in the art will recognize that the benefits of a sensor assembly that includes a one-piece TIF tube having a flange and a method of assembly the same according to embodiments of the present disclosure include, but are not limited to:

- Eliminating the brazing process utilized to couple the TIF tube to a housing portion, as described in the known sensor assembly of FIG. 1.
- Eliminating the brazing seam between the TIF tube and a housing portion of the known sensor assembly of FIG. 1.
- Reducing the complexity of creating a TIF tube piece having a flange for coupling with a disc and support ring.

Aspects of the present invention are described herein with reference to flowchart illustrations and/or block diagrams of methods and apparatuses or systems according to embodiments of the invention.

The flowchart and block diagrams in the Figures illustrate the architecture, functionality, and operation of possible implementations of systems, apparatuses, and methods according to various embodiments of the present invention. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A sensor apparatus comprising:

a one-piece thermal isolated fitting (TIF) tube that includes a cylindrical shaped body portion and a flange at one end of the TIF tube;

the flange having a top surface that is facing away from the cylindrical shaped body portion;

the flange also having an underside surface that is facing towards the cylindrical shaped body portion;

a disc welded to the top surface of the flange; and a support ring welded to the disc.

2. The sensor apparatus of claim 1, wherein the disc is welded to the top surface of the flange by a continuous circumferential weld, and wherein the support ring is welded to the disc by a continuous circumferential weld.

3. The sensor apparatus of claim 1 further comprising a washer welded to the underside surface of the flange.

4. The sensor apparatus of claim 1 wherein the one-piece TIF tube is a unitary structure free of a brazed joint between a tube portion and a housing portion.

5. The sensor apparatus of claim 1 wherein the one-piece TIF tube comprises a stainless-steel-clad copper material or a copper-clad stainless steel material.

6. A sensor apparatus comprising:

a one-piece thermal isolated fitting (TIF) tube that includes a cylindrical shaped body portion and a flange at one end of the TIF tube;

the flange having a top surface that is facing away from the cylindrical shaped body portion;

the flange also having an underside surface that is facing towards the cylindrical shaped body portion;

a disc welded to the top surface of the flange; and a support ring attached to the disc.

7. The sensor apparatus of claim 6 comprising:

a washer welded to the underside surface of the flange.

8. The sensor apparatus of claim 6 wherein during a welding operation, the disc is welded to the top surface of the flange, the support ring is welded to the disc, and a washer is welded to the underside surface of the flange.

9. The sensor apparatus of claim 8, wherein the welding operation is a Tungsten Inert Gas (TIG) welding operation.

* * * * *